Jan. 8, 1929.

H. H. MAPELSDEN 1,698,314

FLOW METER

Filed Nov. 9, 1923

Inventor:
Harold H. Mapelsden,
by *Alexander F. Lunt*
His Attorney.

Patented Jan. 8, 1929.

1,698,314

UNITED STATES PATENT OFFICE.

HAROLD H. MAPELSDEN, OF SCHENECTADY, NEW YORK, ASSIGNOR, BY MESNE ASSIGNMENTS, TO BAILEY METER COMPANY, A CORPORATION OF DELAWARE.

FLOW METER.

Application filed November 9, 1923. Serial No. 673,812.

The present invention relates to flow meters and has for its object to provide an improved arrangement whereby a single flow meter may be used to measure flow in either direction without the necessity of opening or closing any valves or changing any connections.

For a consideration of what I believe to be novel and my invention, attention is directed to the accompanying description and the claims appended thereto.

Figure 1:
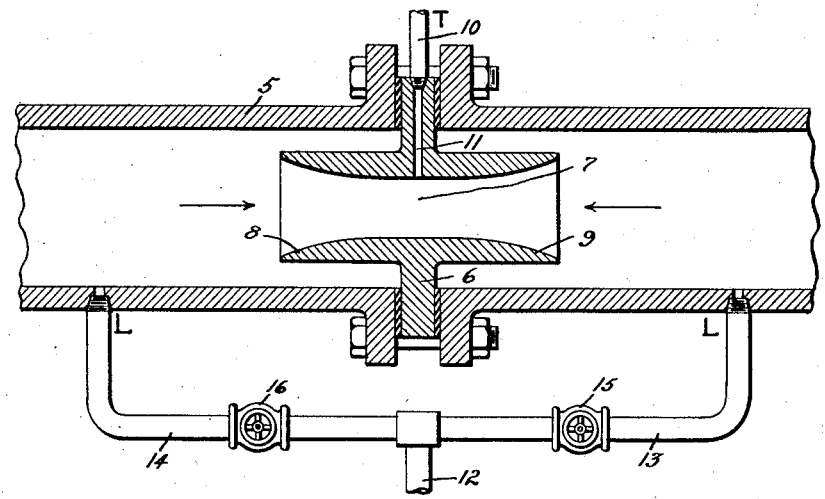
Figure 2:
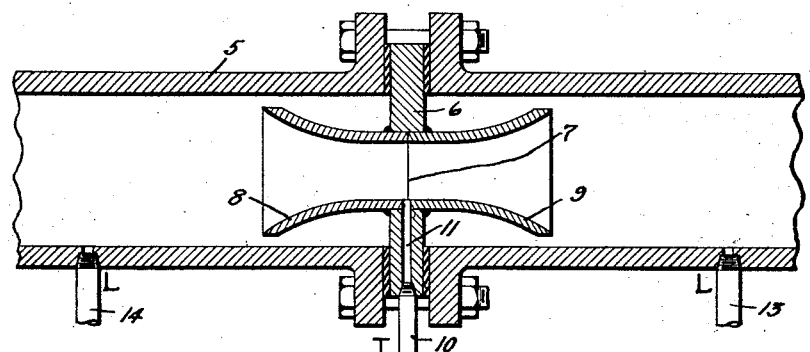
Figure 3:
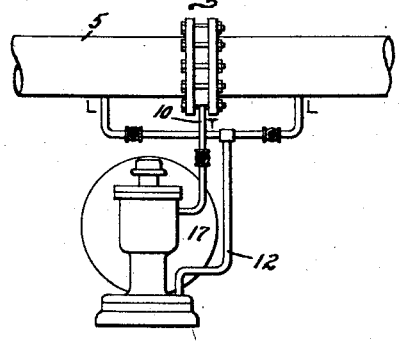

In the drawing, Fig. 1 is a sectional view of a conduit through which a fluid to be metered flows and with which is associated a pressure difference creating device and pressure pipe connections embodying my invention; Fig. 2 shows a modified construction of pressure difference creating device, and Fig. 3 shows complete meter connections.

Referring to the drawing, 5 indicates a conduit through which the fluid to be metered flows.

According to my invention, I arrange in conduit 5 between adjacent flanged pipe ends, a disk 6 provided with a central opening 7 and with outwardly flared nozzles 8 and 9 adjacent opening 7 and projecting in opposite directions from said opening. The two nozzles are alike in structure and dimensions and provide passages which communicate with and merge into opening 7. This forms a sort of Venturi shaped passage in the conduit through which the fluid to be metered flows, and as is well known the fluid in flowing through this passage will first have a portion of its pressure converted into velocity following which the velocity is reconverted into pressure, the region of lowest pressure being at the throat of the passage, i. e., at the plane of smallest cross-section. All the pressure drop through a device of this character is not recovered but the major portion is, the amount depending on the particular design of the device and the condition of flow. I then connect the trailing pressure pipe of the meter to the throat of the Venturi shaped passage, that is, to opening 7 and the leading pressure pipe to conduit 5 on each side of disk 6 and at points equally spaced therefrom. The trailing pressure pipe is indicated at 10 and it is connected to opening 7 by a passage 11 in disk 6. The leading pressure pipe is indicated at 12 and it is connected to conduit 5 by two branch pipes 13 and 14. In branch pipes 13 and 14 are suitable valves 15 and 16 which may be used to shut off the branch pipes when desired. In Fig. 3, 17 indicates the indicating or recording instrument of the flow meter, the same being a form of U-tube manometer as is well understood and trailing pressure pipe 10 is shown connected to one leg of the manometer and leading pressure pipe 12 is shown connected to the other leg of the manometer.

The pressure difference creating device comprising disk 6 and flared nozzles 8 and 9 may be constructed in any suitable manner. In Fig. 1 it is shown as an integral structure, while in Fig. 2 it is shown as comprising a separate disk to which is attached by welding or other means, two curved or flared nozzles which are formed separately of suitable material.

In normal operation, valves 15 and 16 are open and hence the pressure in leading pipe 12 will be a combination or equalization of the two pressures in branch pipes 13 and 14, and since these two branch pipes are connected to conduit 5 at equal distances from disk 6, this resultant pressure in leading pipe 12 will be the same under like conditions irrespective of the direction of flow. The flow meter, therefore, will measure flow in either direction equally well and without making any adjustments whatever.

The instrument 17 may be of any suitable structure, instruments of this type being well known. It is accordingly illustrated only in outline since its detail structure forms no part of the present invention.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a conduit, of a pressure difference creating device therein which defines a Venturi shaped passage, each end of which is of the same contour, a trailing pressure pipe connected to the throat of said passage, and a leading pressure pipe which has branches continuously open during operation connected to the conduit at equal distances from and on opposite sides of said device.

2. The combination with a conduit, of a pressure difference creating device therein comprising a disk having a central opening and similar flanges on each side of the disk which define flared passages which are of the same contour and which merge into said central opening, a trailing pressure pipe which is connected to said central opening, and a leading pressure pipe which has normally open branch pipes connected to said conduit at points equally spaced from and on opposite sides of said pressure difference creating device.

In witness whereof, I have hereunto set my hand this 8th day of November, 1923.

HAROLD H. MAPELSDEN.